US012774635B2

(12) United States Patent
Ayton et al.

(10) Patent No.: US 12,774,635 B2
(45) Date of Patent: Oct. 27, 2026

(54) DYNAMIC PEDESTRIAN ACCESS TERMINAL

(71) Applicant: RSG International Corp., Stouffville (CA)

(72) Inventors: Mark Christopher Ayton, Welland (CA); Benjamin Fraser Powell, King City (CA); Dean Clinton Alberson, Ingram, TX (US)

( * ) Notice: Subject to any disclaimer, the term of this patent is extended or adjusted under 35 U.S.C. 154(b) by 356 days.

(21) Appl. No.: 18/641,032

(22) Filed: Apr. 19, 2024

(65) Prior Publication Data

US 2025/0327255 A1 Oct. 23, 2025

(51) Int. Cl.
*E06B 11/00* (2006.01)

(52) U.S. Cl.
CPC .................................... *E06B 11/00* (2013.01)

(58) Field of Classification Search
None
See application file for complete search history.

(56) References Cited

U.S. PATENT DOCUMENTS 1,553,785 A 9/1925 Ley
3,390,865 A 7/1968 Victor et al.
5,547,309 A 8/1996 Mak et al.
6,748,703 B1 6/2004 Mandart
7,037,028 B1 5/2006 Donohoe et al.
7,052,201 B2 * 5/2006 Zivkovic ................. E01F 9/685 404/11
7,641,416 B2 1/2010 Miracle
8,087,443 B2 1/2012 Snyder et al.
8,807,864 B2 8/2014 Kulkarni et al.
9,909,271 B2 * 3/2018 Wiegel .................. E01F 15/003
12,571,258 B2 3/2026 Ayton et al.
2008/0121856 A1 5/2008 Alberson et al.
(Continued)

FOREIGN PATENT DOCUMENTS

CH 618226 A5 * 7/1980 ............ E01F 15/088
CN 108411829 A * 8/2018 ............ E01F 15/145
(Continued)

OTHER PUBLICATIONS

EPO, extended Search Report, Application No. 22880478.7, dated Aug. 8, 2025, 8 pages.
(Continued)

*Primary Examiner* — Christopher J Sebesta
*Assistant Examiner* — Katherine J Chu
(74) *Attorney, Agent, or Firm* — John G. Fischer, Esq.; Scheef & Stone, L.L.P.

(57) ABSTRACT

A dynamic pedestrian access terminal is disclosed having a pair of spaced apart terminal blocks for pedestrian passage along a roadway. The bottom portions of the terminal blocks are set beneath the surface. Foundation posts are vertically positioned below the surface and extend upward into each terminal block. A tensioning member extends between the foundation posts and beneath the terminal blocks to increase resistance to lateral movement. Soil plates may be attached to the foundation posts to further resist lateral movement. An internal attenuator is positioned in a compression chamber within each terminal block. An external attenuator may be positioned in a recess positioned at the bottom rear of each terminal block.

25 Claims, 13 Drawing Sheets

(56) References Cited

U.S. PATENT DOCUMENTS

| | | | | |
|---|---|---|---|---|
| 2021/0148068 | A1 | 5/2021 | Prins | |
| 2023/0121725 | A1 | 4/2023 | Ayton et al. | |
| 2023/0392331 | A1* | 12/2023 | Stone | E01F 13/048 |

FOREIGN PATENT DOCUMENTS

| | | | | | |
|---|---|---|---|---|---|
| CN | 108532480 | A | | 9/2018 | |
| CN | 208328786 | U | | 1/2019 | |
| CN | 109577247 | A | * | 4/2019 | E01F 15/14 |
| CN | 208685447 | U | | 4/2019 | |
| CN | 107806039 | B | * | 8/2019 | E01F 15/00 |
| CN | 114991042 | A | * | 9/2022 | E01F 15/146 |
| CN | 113123274 | B | * | 3/2023 | E01F 15/02 |
| CN | 116516866 | A | * | 8/2023 | E01F 15/0476 |
| DE | 102006038336 | B3 | | 12/2007 | |
| DE | 202021004283 | U1 | * | 6/2023 | E01F 15/146 |
| EP | 0596405 | A1 | | 5/1994 | |
| EP | 1 541 768 | A1 | | 6/2005 | |
| FR | 2278881 | A1 | | 2/1976 | |
| GB | 2510320 | A | * | 8/2014 | E01F 13/02 |
| JP | 6863910 | B2 | | 4/2021 | |
| KR | 960037565 | U | | 12/1996 | |
| KR | 20030042173 | A | | 5/2003 | |
| KR | 2003-0086152 | A | | 11/2003 | |
| KR | 101778300 | B1 | | 9/2017 | |
| KR | 10-2017-0115262 | A | | 10/2017 | |
| KR | 20220036536 | A | * | 3/2022 | E01F 15/0484 |
| WO | 2023/173468 | A1 | | 9/2023 | |

OTHER PUBLICATIONS

CIPO, International Search Report, PCT/IB2022/000716, dated May 4, 2023, 13 pages.

CIPO, International Search Report, PCT/CA2024/050526, dated Jan. 2, 2025, 10 pages.

CIPO, International Search Report, PCT/CA2024/050524, dated Jan. 15, 2025, 8 pages.

* cited by examiner

DYNAMIC PEDESTRIAN ACCESS TERMINAL

RELATED APPLICATION

None.

FIELD OF THE DISCLOSURE

This disclosure relates to a dynamic translating pedestrian access terminal such as may be used in a roadside traffic barrier to permit pedestrian access to a beach front or other attraction.

BACKGROUND

A need has been identified along roadways adjacent to pedestrian attractions such as waterbodies and hiking trails where roadside barriers are required to protect errant vehicles from encroaching into the waterbody or trail while maintaining access points through the barrier system for residents living on the opposite side of the roadway to get to the beach, dock, or trail (which may be beyond the roadway right-of-way and owned by the resident).

In some instances, local road authorities create access points through the barrier system that compromise the performance capability of the system to redirect an errant vehicle. This creates potentially hazardous ends that could penetrate and spear vehicle occupants. In other situations, residents have cut or removed parts of the barrier to provide access points.

There is a need to provide standard crashworthy terminal systems on either side of an access point that will properly anchor the end of a road barrier, such as a W-beam or thrie-beam or cable barrier system, to make the roadside barrier system redirective and functional. There is a need to provide standard crashworthy terminal systems to eliminate the potential spearing hazard of a W-beam guardrail improperly terminated with a fish-tail.

Current standard crashworthy terminal systems have gating characteristics which means that when a vehicle impacts them near the start of the terminal, they gate out of the way. One disadvantage to these systems when placed on either side of a gap is that the effective length of the gap through which an errant vehicle could get through the system into the waterbody or other terrain hazard is much longer than the physical opening length of gap provided for pedestrian access.

Terminal systems for a W-beam guardrail are typically gating systems. Another disadvantage to these systems is that W-beam terminal systems typically gate during impacts in advance of the third post downstream of the impact head. Therefore, W-beam terminal systems with a W-beam guardrail on either side of a narrow 33 inch to 65 inch wide access point for pedestrians may result in an effective gap length of approximately 30 feet. For high tension cable barrier system terminals, the effective gap length is significantly longer.

Another disadvantage to these systems is that grading requirements behind gating terminal systems require widening of the roadway in advance and along the terminal and flatter traversable slopes perpendicular to the roadway for the systems to perform as designed. At many roadway locations adjacent to waterbodies where access points are required, widening of the roadway to provide the recommended grading for gating terminals is not practical as it may require placing fill into the waterway.

Non-gating crash cushion options for W-beam and concrete barriers are available that could be used on each side of an access point. One disadvantage to these systems is that crash cushions are typically very expensive to install and require widening of the roadway in advance and along the system and flatter traversable slopes perpendicular to the roadway for the systems to perform as designed. Another disadvantage to these systems is that they are expensive to maintain. Another disadvantage to these systems is that they can be expensive to repair after impacts, dependent on severity and type of impact, and type of system (many use crushable cartridges). Another disadvantage to these systems is that they are also not aesthetically pleasing.

The National Highway Traffic Safety Administration (NHTSA) in the United States has been conducting frontal crash tests since 1978 to assess occupant protection capabilities of new cars. New vehicles are crashed head-on perpendicular into a non-deformable rigid barrier at 56 km/h (35 mph).

Air bags with lap and shoulder belts for drivers and front passengers have been required by legislation in the United States on cars manufactured since Sep. 1, 1997, and on light trucks and vans manufactured after Sep. 1, 1998. These measures significantly increase the survivability of a frontal crash.

There remained an opportunity for a pedestrian access terminal that relies on the increased safety of vehicles to safely absorb a limited impact in the design of a pedestrian access terminal. There is also a need for a pedestrian access terminal that limits the probability of an arresting frontal impact.

One solution to the foregoing problems was presented in U.S. patent application Ser. No. 17/966,453 for a static (stationary) pedestrian access terminal. An advantage of the embodiments of the static pedestrian access terminal is that it provides a crashworthy terminal system to allow pedestrian access through a gap in a traffic barrier system such as a W-beam guardrail on lower speed roadways that will meet the crash test requirements of the American Association of State Highway Officials (AASHTO) Manual for Assessment of Safety Hardware (MASH) Test Level 1 (50 km/h [31 MPH]). Other advantages of the static pedestrian access terminal invention are that it is less expensive to install as it does not require extensive widening of the roadway in advance of installation. Other advantages include that it is less expensive to maintain, less expensive to repair and that it is aesthetically pleasing.

An additional advantage of an embodiment of that invention is that it provides a replaceable endcap for attachment to the pedestrian access ends of the terminal blocks for the system to be used on moderate speed roadways that will meet the crash test requirements of AASHTO MASH Test Level 2 (70 km/h [43 MPH]). However, the energy absorbing endcap design is limited in its ability to absorb energy from vehicular impact due to the stationary nature of the static terminal blocks on which the endcaps are mounted. It thus relies primarily on the vehicles' ability to safely absorb a limited impact. Because speeds and weights of impacting vehicles vary widely, the impact required for the vehicle to absorb may exceed the amount the vehicle is capable of absorbing. It further suffers from the external exposure of the compressible endcap to the elements, which result in a shortened lifespan.

Therefore, there remains a need to provide a pedestrian access system that has many of the benefits of the disclosure of U.S. patent application Ser. No. 17/966,453, but with the ability to absorb a greater amount of energy upon impact, to reduce reliance of the energy absorbing characteristics of the vehicle, to provide a safer system for occupants of the vehicle.

The disclosure of U.S. patent application Ser. No. 17/966,453 obtains its benefits by presenting a pair of opposing stationary terminal blocks of significant weight, secured to foundation posts that extend deep below the surface, and that are tethered together by a tensioning member. Soil plates and subsurface positioning of the terminal blocks further resists movement of the terminal block on impact. The system is designed to prevent any movement of the terminal blocks on impact with a vehicle.

The present invention provides an alternative to the fundamental design principal of stationary terminal blocks, embodied in the disclosure of U.S. patent application Ser. No. 17/966,453. The present disclosure discloses a dynamic pedestrian access terminal having range-limited translatable terminal blocks that define an access for pedestrians. In essence, the present disclosure represents a reversal of the engineering principals relied upon in the disclosure of U.S. patent application Ser. No. 17/966,453. The purpose of the reversal is to significantly increase the amount of energy absorbed by the system as a means of lowering the amount of energy required to be absorbed by the impacting vehicle, while still preventing destructive collapse of the pedestrian access path.

The objective is achieved by utilizing the substantial weight of the terminal blocks, translated against the resistance of a compressible attenuator. The purpose may very affectively be achieved by incorporation of a parallel system of compressible attenuators. This allows for greater energy absorption over a short distance to accommodate more energy absorption by the attenuators within the limited allowable translation within the structural confines of the terminal block design, that must also prevent collapse of the pedestrian path.

In summary, the disclosed invention provides a unique solution to the engineering constraints and challenges of providing a pedestrian access terminal that protects pedestrians, prevents gating destruction to the terminal, and is cost effective to install, maintain, and repair. The disclosed invention provides the benefits listed above while first and foremost maintaining the safety of the vehicle occupants where installed. The disclosed invention safely and economically overcomes the aforementioned disadvantages.

The advantages and features of the embodiments presently disclosed will become more readily understood from the following detailed description and appended claims when read in conjunction with the accompanying drawings in which like numerals represent like elements.

SUMMARY

As used herein, "attenuator" shall mean an energy absorbing material, structure or device.

In one embodiment, the pedestrian access terminal is comprised of a right side and a left side terminal block spaced apart for pedestrian passage along a roadway. Each terminal block comprises a top and an opposite bottom, with the bottom positioned beneath the surface of the road. Each terminal has an access end between which pedestrians may pass, and an opposite non-access end, which may be connected to roadside barriers. Each terminal block has a traffic side and an opposite field side.

A portal extends from the top to the bottom of each terminal block. A compression chamber extends from the top to the bottom, immediately adjacent to the portal. A plurality of portal slots extends through the traffic side of each terminal block to intersect the portal.

A pair of foundation posts is positioned below the surface and extends above the surface and into the portal of each terminal block. Portal fasteners are positioned in the portal slots of the traffic side and connected to the foundation posts in each terminal block. The portal slots permit translation of the portal fasteners without disengagement when the terminal block is impacted by a vehicle and translated laterally in relation to the foundation post.

An internal attenuator is located inside the compression chamber. The internal attenuator absorbs energy when compressed between the anchored foundation post and the terminal block by translation of the terminal block upon impact by a vehicle.

In another embodiment, the internal attenuator is a polyurethane material. In another embodiment, the internal attenuator is a honeycomb structured material. In another embodiment, the internal attenuator is an HDPE material.

In another embodiment, an access chamber extends through the top of the terminal block adjacent to the portal. The access chamber terminates inside the terminal block. Chamber slots extend from the traffic side and the field side of the terminal block to the access chamber. Chamber fasteners located in the chamber slots connect a traffic barrier to the terminal block. The slot configuration of the chamber slots permits translation of the chamber fasteners without disengagement when the terminal block is impacted by a vehicle.

In another embodiment, the foundation post is a hollow rectangular steel tubular, having a first pair of opposing sides, one of which is a traffic side. The foundation post has a second pair of opposing sides, one of which is an access side. Block fastener ports extend through the first pair of opposing sides. The portal fasteners pass through the portal slots and into the portal to connect the traffic barrier and foundation post to the terminal block.

In another embodiment, plate fastener ports extend through the second pair of opposing sides of the foundation post, beneath the tensioning portal. A soil plate is provided, with fastener ports in alignment with the plate fastener ports. Soil plate fasteners are located through the fastener ports of the soil plate and the plate fastener ports of the foundation post to secure the soil plate to the foundation post.

In another embodiment, a tensioning portal extends through the second pair of opposing sides of each foundation post. A tensioning member extends through the tensioning portals of each foundation post, beneath the terminal blocks.

In one embodiment, the tensioning member is a threaded steel rod. Internally threaded fasteners are located on the opposite ends of the tensioning member, securing the tensioning member between the foundation posts. Tension on the tensioning member may be adjusted by rotation of the threaded fastener.

In another embodiment, the tensioning member includes a wire rope portion that extends through the tensioning portal of each foundation post. A swage button is connected to the end of each wire rope portion. A plate washer anchors the swage button of each tensioning member against the foundation post to allow the tensioning member to be tensioned as between the foundation posts.

In another embodiment, a recess is located at an intersection of the bottom and the non-access end of the terminal block. An external attenuator is located in the recess. A tray encloses the external attenuator between the recess and the tray. The external attenuator absorbs energy when compressed between the tray, held stationary by the soil, and the terminal block by translation of the terminal block upon impact by a vehicle.

In another embodiment, the external attenuator is a polyurethane material. In another embodiment, the external attenuator is a honeycomb structured material. In another embodiment, the external attenuator is an HDPE material.

In another embodiment, a plurality of tray slots extends into the terminal blocks proximate the recess. Tray fasteners are located in the tray slots and connect each tray in translatable relation to one of the terminal blocks. The slot configuration of the tray slots permits translation of the tray fasteners without disengagement when the terminal block is impacted by a vehicle.

In another embodiment, the recess has a width equal to a width of the compression chamber. In another embodiment, the internal attenuator has a width equal to a width of the external attenuator. This permits parallel actuation of the internal and external attenuators.

In another embodiment, a pair of lifting anchors is connectable to the top of each terminal block. A cover plate sufficiently large to cover the portal and the access chamber on the top of the terminal block is provided. The cover plate has a pair of cover ports. Cover fasteners are located in the cover plate and connectable to the lifting anchors to secure the cover plate to the top of the terminal block.

DETAILED DESCRIPTION

The following description is presented to enable any person skilled in the art to make and use the invention and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the illustrated and described embodiments but is to be accorded the widest scope consistent with the principles and features disclosed herein.

Figure 1:
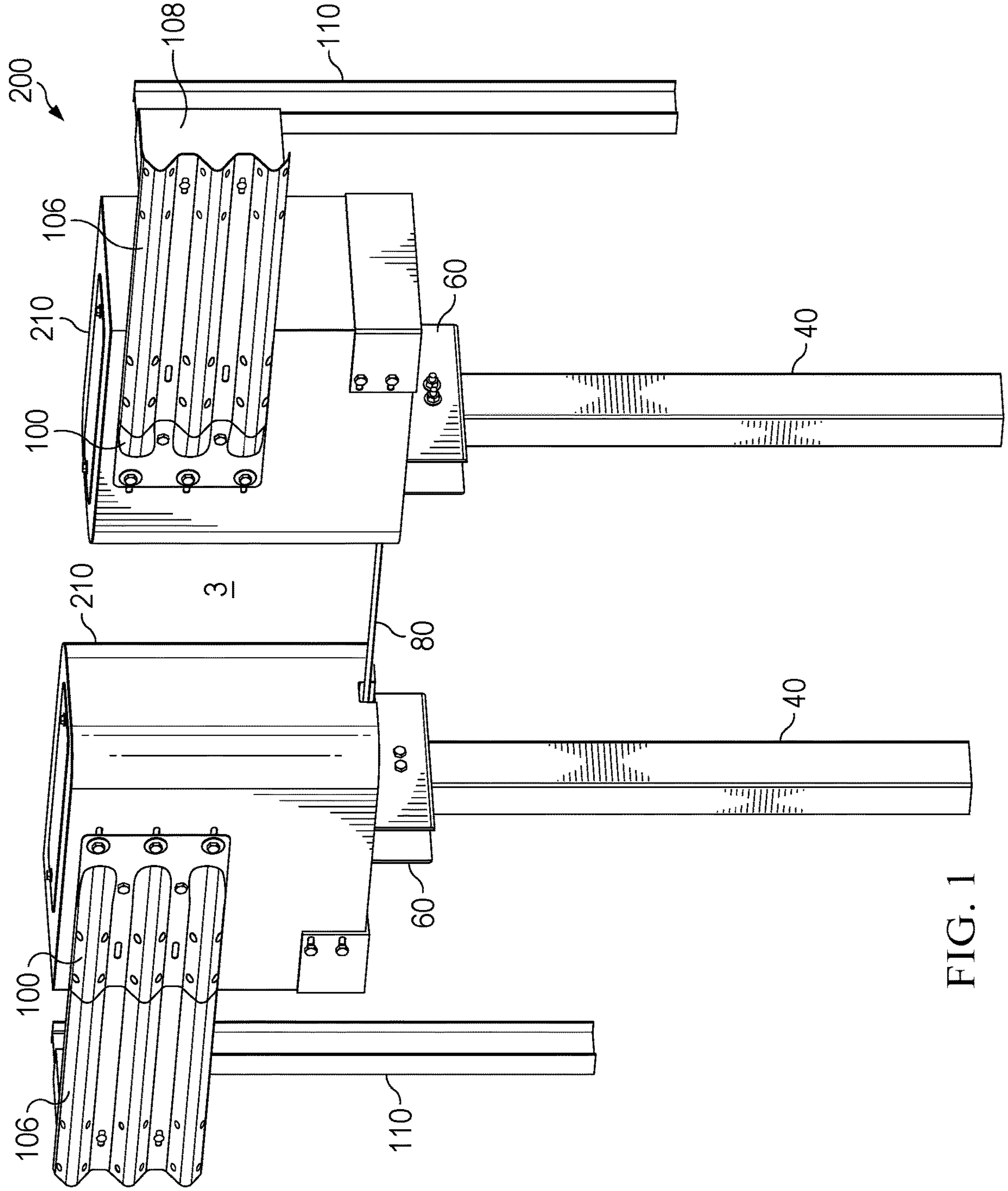
FIG. 1 is a perspective view of an embodiment of a dynamic pedestrian access terminal.

FIG. 1 is a perspective view of an embodiment of dynamic pedestrian access terminal 200 of the present disclosure. As seen in this view, a pair of opposing terminal blocks 210 is provided with a passage 3 between them to permit pedestrians to pass. Each terminal block 210 is mounted to a foundation post 40, to which it is attached by fasteners.

A soil plate 60 is mounted to one or both sides of foundation post 40 to help resist lateral movement when terminal block 210 is impacted by a vehicle. For this purpose, soil plates 60 face the pedestrian access opening 3 between terminal blocks 210.

A tensioning member 80 may be connected between foundation posts 40 to further recess lateral movement of terminal block 210 when struck by a vehicle. Tensioning member 80 and soil plates 60 are located beneath road surface 2. A road barrier transition 100, such as a standard W-beam or thrie-beam barrier, is attached to each terminal block 210. Transition 100 is interconnected to an adjacent road barrier section 106 which may be attached to an offset block 108 and a guardrail post 110. In one embodiment, terminal blocks 210 are connected to a crashworthy transition 100 and road barrier section 106 that meets the requirements of AASHTO MASH TL-2.

Terminal blocks 210 are typically made of precast concrete and have a mass of between 3,000 and 3,600 lbs. (1361-1633 kg). In one embodiment, terminal blocks 210 are located at a distance of about 3.3 feet (1.0 meter) apart. In one embodiment, a bottom 214 (see FIG. 3) of terminal blocks 210 is set approximately 8 inches (20 cm) below surface 2. In this embodiment, foundation posts 40 are embedded at least 7 feet (2.1 meters) below surface 2. It will be appreciated by one of ordinary skill in the art that the precise relationships between the elements can be adjusted to obtain a similar result. For example, heavier foundation posts 40 and larger soil plates 60 could be used in combination with a shallower embedment depth of foundation posts 40. The same is true regarding the 8 inch (20 cm) embedment depth of terminal blocks 210.

Figure 2:
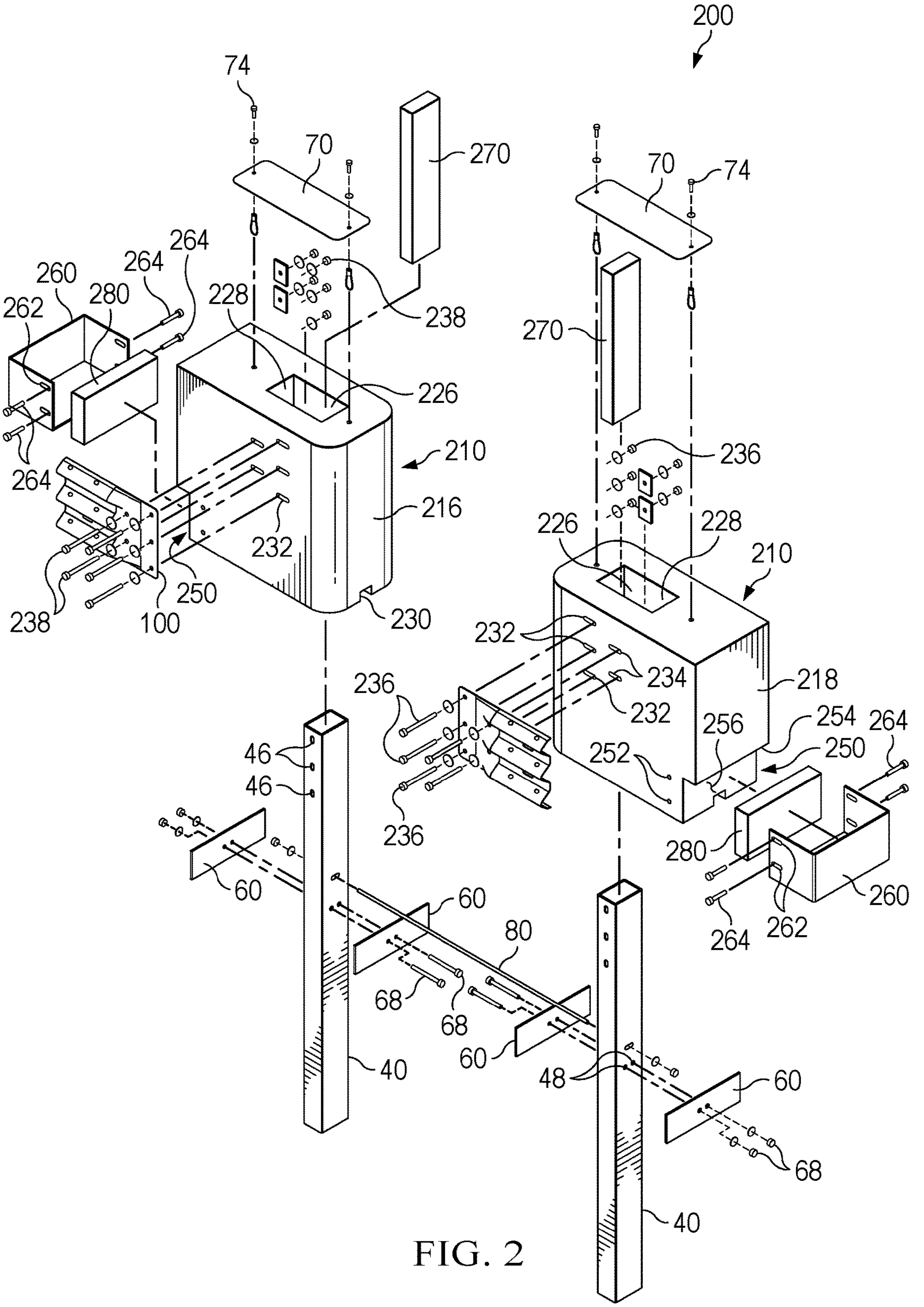
FIG. 2 is an exploded perspective view of an embodiment of the dynamic pedestrian access terminal with translatable terminal blocks.

FIG. 2 is an exploded perspective view of an embodiment of dynamic pedestrian access terminal 200 with translatable terminal blocks 210, including an embodiment comprising parallel internal and external attenuators.

Opposing terminal blocks 210 are provided with a passage 3 (FIG. 15) to permit pedestrians to pass between them. Each terminal block 210 is mounted to a foundation post 40, to which it is attached by fasteners 236. Soil plate 60 is mounted to each side of foundation post 40 to help resist lateral movement of foundation post 40 when terminal block 210 is struck by a vehicle. For this purpose, soil plates 60 face the pedestrian passage 3 between terminal blocks 210.

In the embodiment illustrated, terminal blocks 210 are positioned subsurface, such that a terminal bottom 214 (see FIG. 3) is located below surface 2. In this embodiment, a tensioning member 80 may be connected between foundation posts 40 to further resist lateral movement and distortion of the foundation posts 40 when one terminal block 210 is struck by a vehicle. Tensioning member 80 and soil plates 60 are shown located beneath ground surface 2 in FIGS. 15 and 16.

Figure 4:
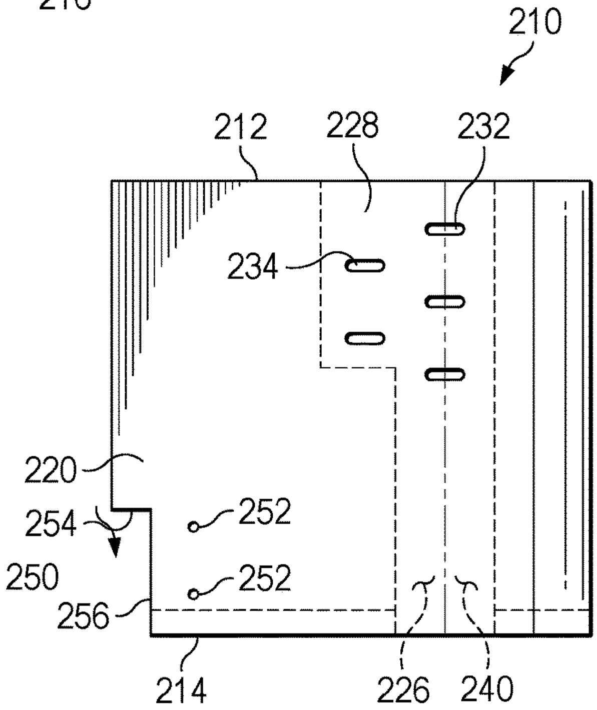
FIG. 4 is a side view of the terminal block shown in FIG. 3.
Figure 5:
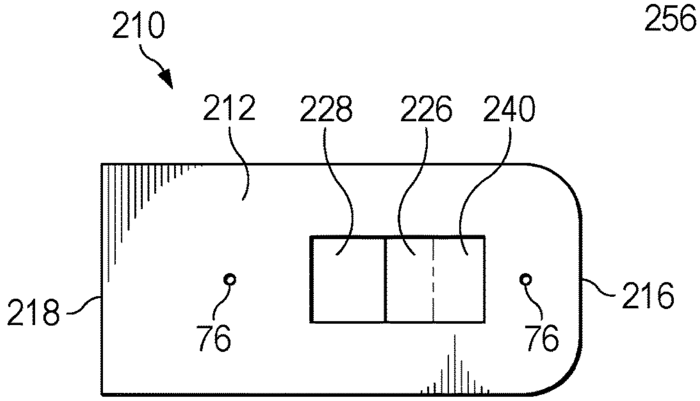
FIG. 5 is a top view of the terminal block shown in FIG. 3.

Referring ahead to FIGS. 4 and 5, terminal block 210 has a terminal top 212 and opposite terminal bottom 214. Terminal block 210 has an access end 216 and a no-access end 218.

Figure 15:
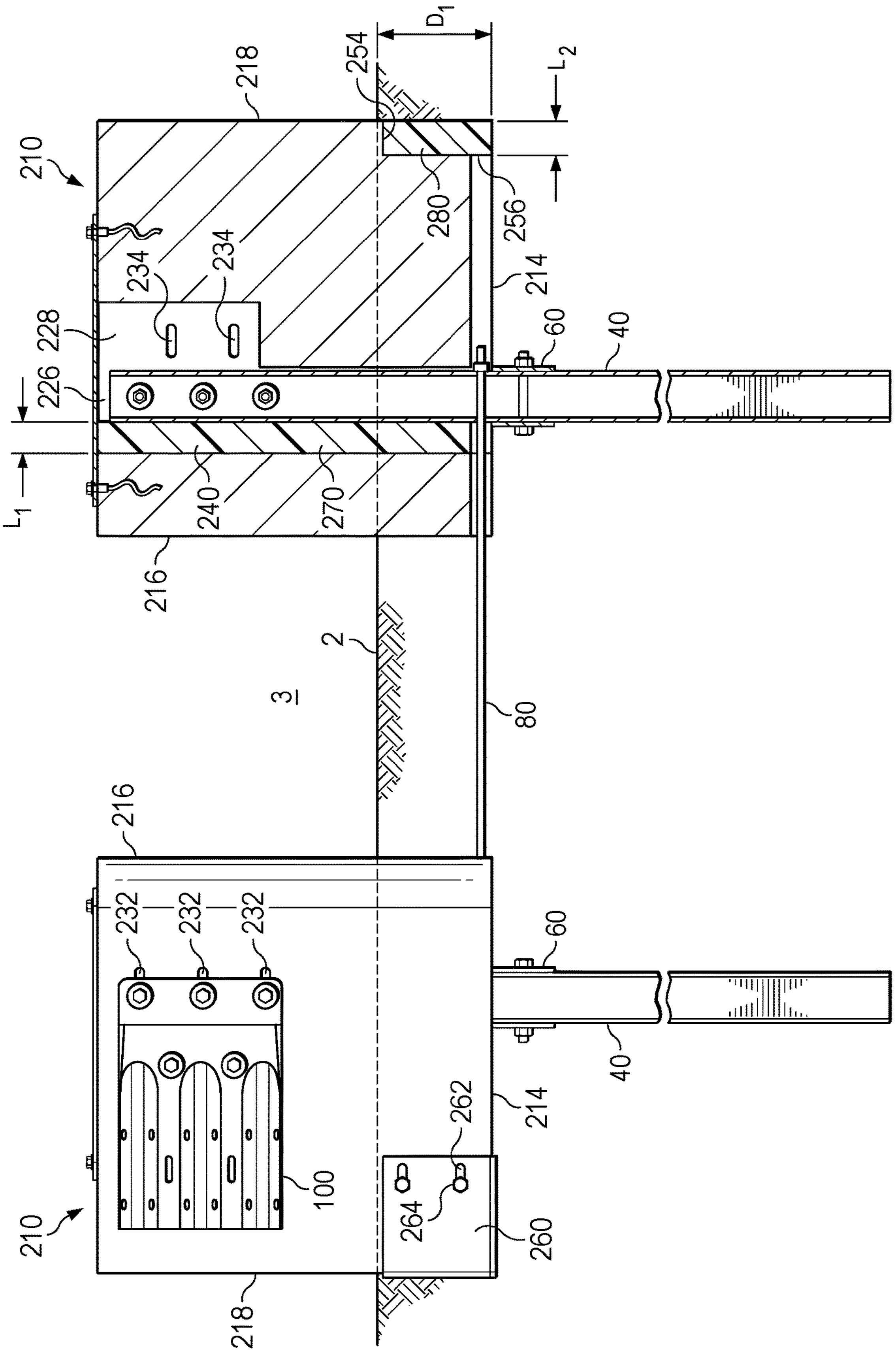
FIG. 15 is a side view of the first terminal block and a side sectional view of the second terminal block of the dynamic pedestrian access terminal illustrated in FIG. 2, illustrated with polyurethane attenuators.
Figure 16:
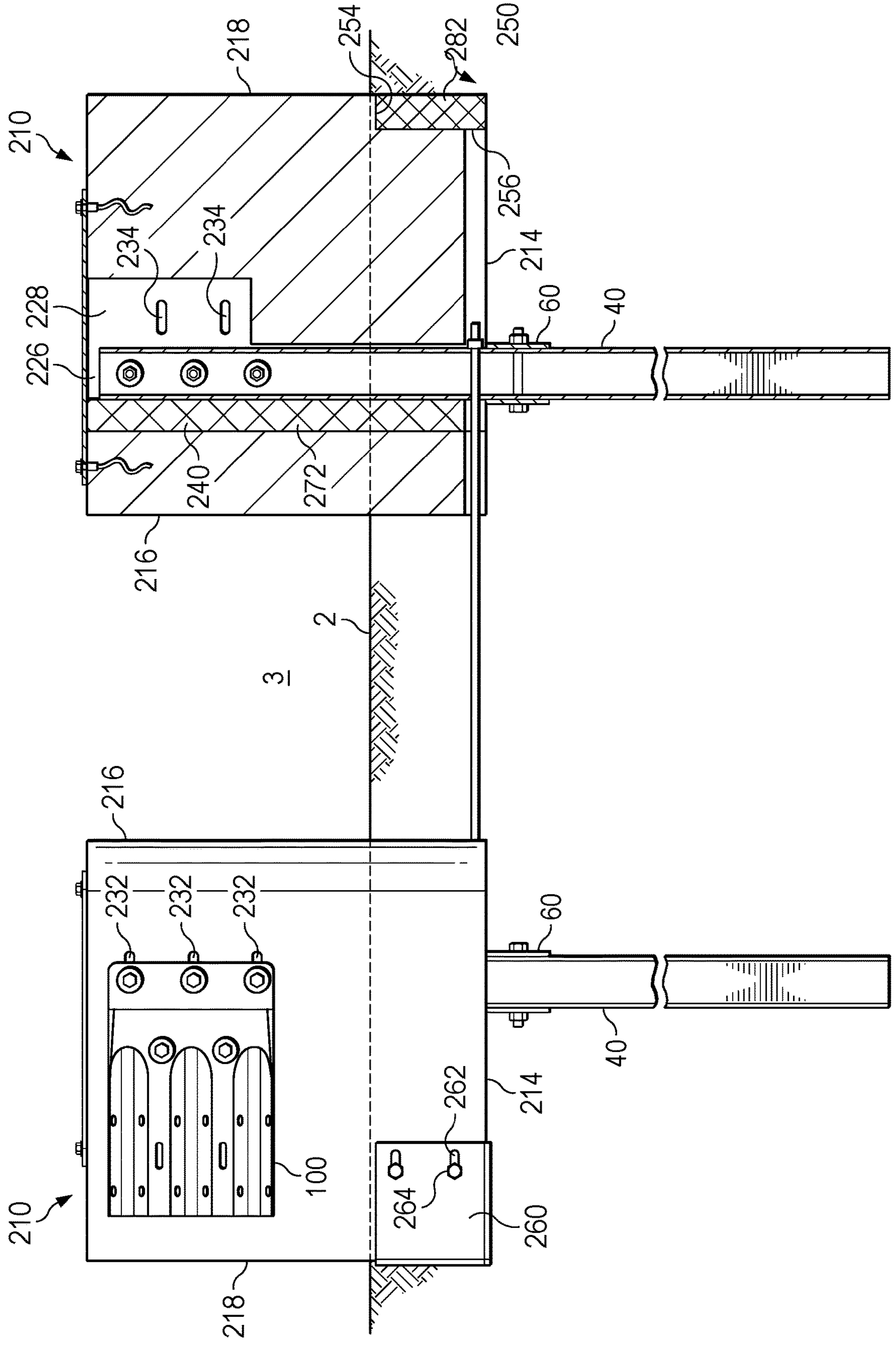
FIG. 16 is a side view of the first terminal block and a side sectional view of the second terminal block of the dynamic pedestrian access terminal illustrated in FIG. 2, illustrated with honeycomb attenuators.

Though reversible, terminal block 210 has a traffic side 220 and a field side 222 when placed in position beside a roadway. As seen in FIGS. 15 and 16, pedestrian passage 3 is provided between opposing access ends 216 of opposing terminal blocks 210 where there is no structure between terminal blocks 210 above surface 2 impeding passage 3. Pedestrians, horses, pets, and such are thus provided protected movement through passage 3 between traffic side 220 of pedestrian access terminal 200 and field side 222 of pedestrian access terminal 200.

Figure 3:
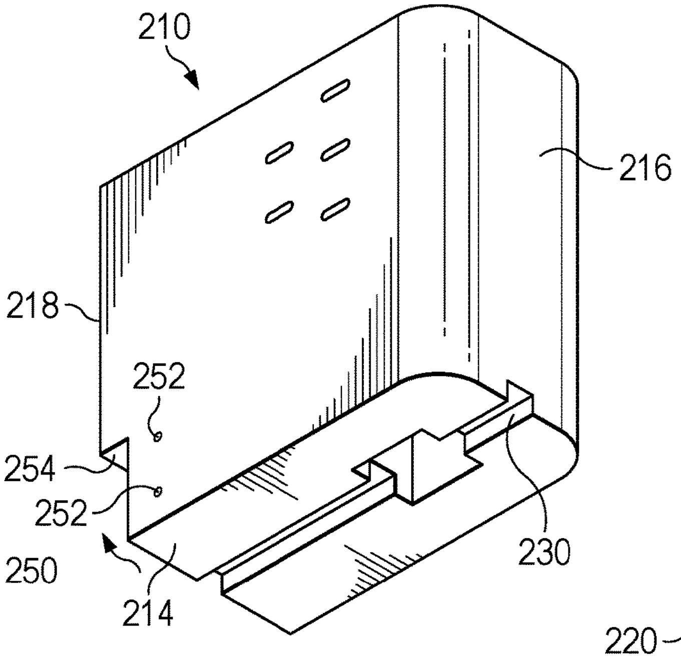
FIG. 3 is a bottom isometric view of the terminal block shown in FIG. 2.
Figure 6:
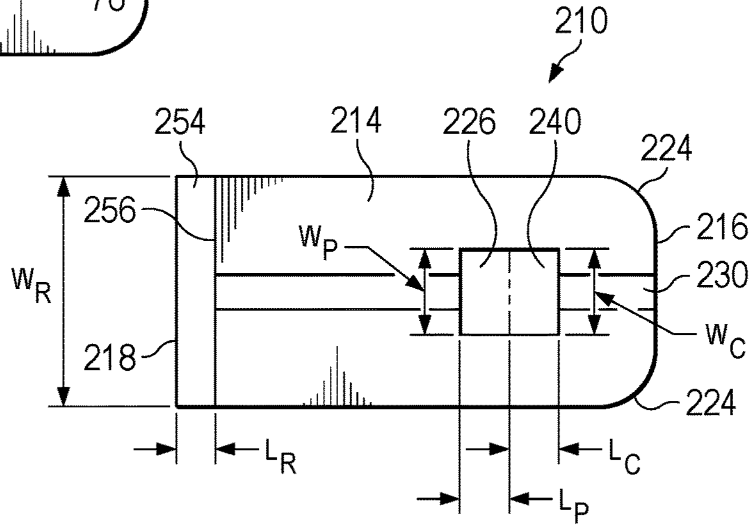
FIG. 6 is a bottom view of the terminal block shown in FIG. 3.

FIG. 3 is a bottom isometric view of the embodiment of terminal block 210 shown in FIG. 2. FIG. 4 is a side view of terminal block 210 shown in FIG. 3. FIG. 5 is a top view of terminal block 210 shown in FIG. 3. FIG. 6 is a bottom view of terminal block 210 shown in FIG. 3.

As best seen in FIGS. 4 and 5, terminal block 210 has a portal 226 extending through terminal top 212 and terminal bottom 214. As best seen in FIGS. 13-16 and 18, portal 226 receives foundation post 40.

In FIG. 4, a plurality of portal slots 232 extend through traffic side 220 of terminal block 210 to intersect with portal 226. Portal slots 232 may also extend through field side 222 of terminal block 210 to intersect with portal 226. In this configuration, terminal block 210 is reversible with regard to portal slots 232 and in relationship to the roadway. Portal fasteners 236 located in portal slots 232 connect terminal block 210, barrier transition 100, and foundation post 40.

Unique to this embodiment, portal fasteners 236 are located horizontally translatable within portal slots 232 and in horizontally translatable relationship to terminal block 210. This connection permits limited translation of terminal block 210 without requiring deformation of foundation post 40, or demolition of portal fasteners 236 or transition 100.

Unique to the present disclosure, a compression chamber 240 extends through terminal top 212 and terminal bottom 214 between the access end 216 of terminal block 210 and portal 226. As shown in the embodiment illustrated, compression chamber 240 and portal 226 form a unitary passage vertically through terminal block 210.

In the embodiment illustrated, terminal 210 has an access chamber 228. Access chamber 228 extends through the top of terminal block 210 between portal 226 and the no-access end 218 of terminal block 210. Access chamber 228 may terminate internal to terminal block 210. Chamber slots 234 extend through traffic side 220 of terminal block 210 to intersect with access chamber 228. Chamber slots 234 may also extend through field side 222. In this configuration, terminal block 210 is reversible with regard to chamber slots 234 and in relationship to the roadway. Chamber fasteners 238 located in chamber slots 234 further secure terminal block 210 to barrier transition 100.

Unique to this embodiment, chamber fasteners 238 are located horizontally translatable within chamber slots 234 and in horizontally translatable relationship to terminal block 210. This connection permits limited translation of terminal block 210 without requiring demolition of chamber fasteners 238 or transition 100.

Figure 14:
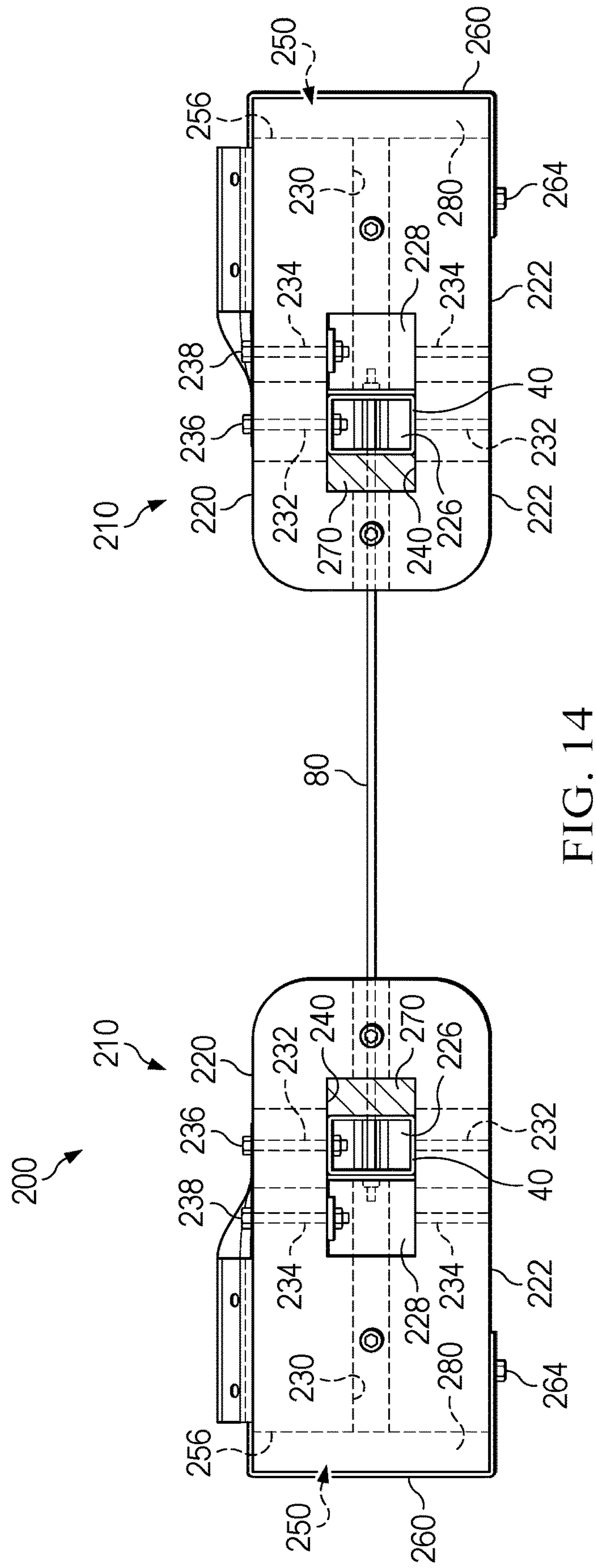
FIG. 14 is a top view of the embodiment of the dynamic pedestrian access terminal illustrated in FIG. 13, further illustrating various passages internal to the embodiment of the terminal block of FIG. 13.

As seen in FIGS. 3 and 6, terminal bottom 214 of terminal block 210 has a relief 230 inscribed across its length. Relief 230 intersects portal 226. As seen in FIG. 4, traffic side 220 of terminal block 210 has a plurality of portal slots 232, and a plurality of chamber slots 234. As best seen in FIG. 14, portal slots 232 intersect portal 226 for receiving portal fasteners 236. Likewise, chamber slots 234 intersect chamber 228 for receiving chamber fasteners 238.

Referring to FIGS. 2 and 3, the embodiment illustrated discloses terminal block 210 having a recess 250 at the intersection of terminal block bottom 214 and no-access end 218. Recess 250 has a recess ceiling 254 and a recess wall 256. As best seen in FIG. 2, recess ports 252 may be advantageously located on each of traffic side 220 and field side 222 of terminal block 210 for receiving tray fasteners 264 for securing a tray 260 over recess 250. Tray 260 has slots 262 for receiving tray fasteners 264 for connection to terminal block 210 at recess ports 252. When tray 260 is attached to terminal block 210, a recess chamber is formed for receiving an external attenuator 280. The external attenuator 280 disclosed in FIGS. 2, 14 and 15 is a polyurethane attenuator 280.

In one embodiment, compression chamber 240 and portal 226 are co-formed as rectilinear. Referring to FIG. 6, portal 226 has a width $W_P$ as measured in the direction between the traffic side 220 of terminal block 210 and field side 222 of terminal block 210. Similarly, compression chamber 240 has a width $W_C$ as measured in the direction between the traffic side 220 of terminal block 210 and field side 222 of terminal block 210. Relief 230 has a width $W_R$ which may be as wide as terminal block 210.

As disclosed in the embodiment illustrated, where foundation post 40 substantially fills portal 226, $W_C$ is at least as wide as $W_P$ to allow translation of terminal block 210 rearward (towards no-access end 218) in relationship to foundation post 40 on impact of a vehicle with terminal block 210. Similarly, allowing foundation post 40 to fill portal 226 allows translation of terminal block 210 to be guided by the path for foundation post 40 into compression chamber 240 on impact of a vehicle with terminal block 210.

Still referring to FIG. 6, portal 226 has a length $L_P$ as measured in the direction perpendicular to portal 226 width $W_P$. Compression chamber 240 has a length $L_C$ as measured in the direction perpendicular to compression chamber 240 width $W_C$. Recess 250 has a length $L_R$ as measured in the same direction as length $L_P$ and length $L_C$.

Allowing length $L_R$ to be substantially equal in length to $L_C$ permits full compression of an internal attenuator 270 and external attenuator 280 in parallel force resistance to translation of terminal block 210. The length relationship between length $L_P$ and lengths $L_C$ and $L_R$ can be varied to control the desired amount of translation of terminal block 210 for response optimization.

Figure 17:
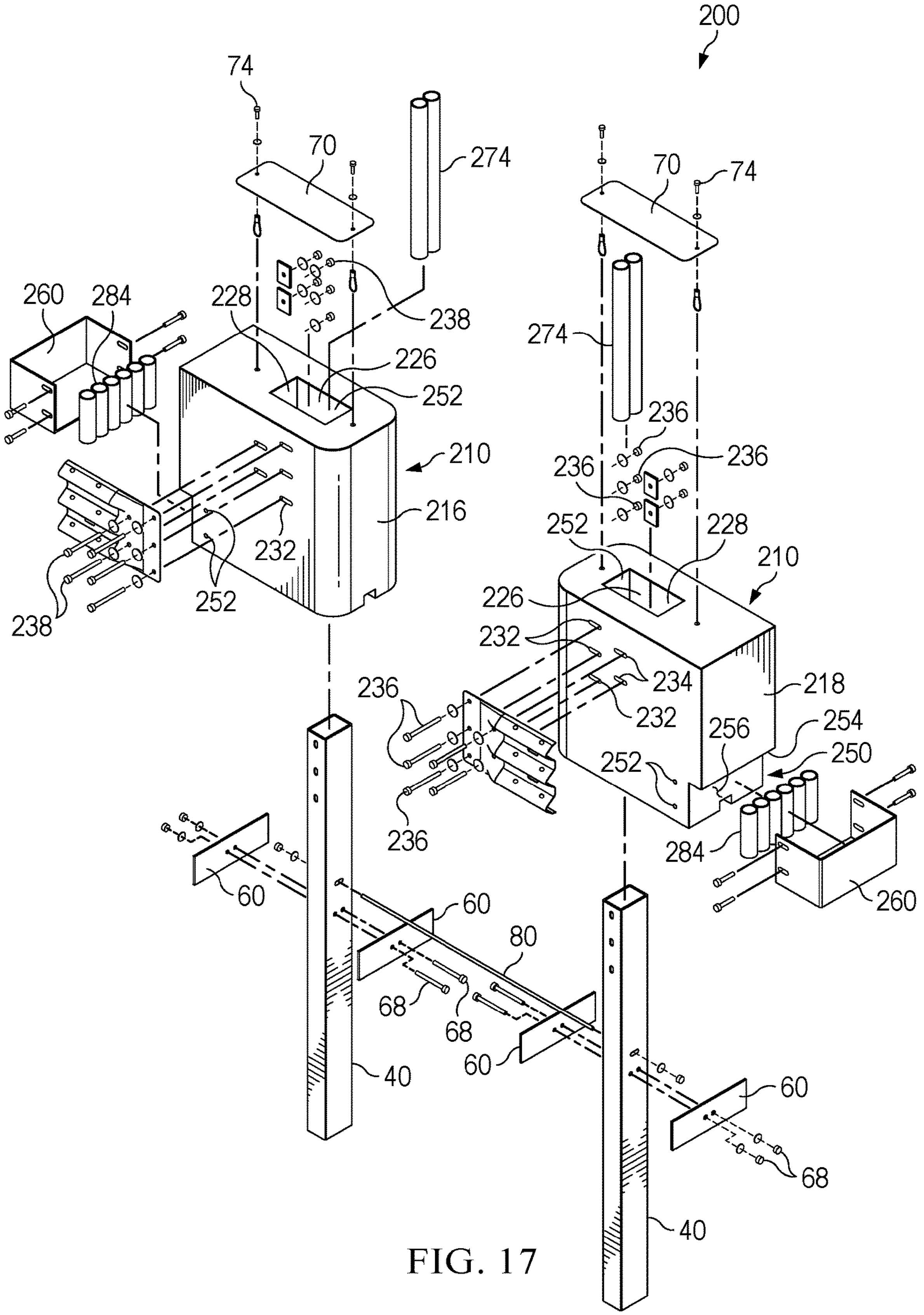
FIG. 17 is an exploded perspective view, showing additional element features and relationships of the dynamic pedestrian access terminal illustrated in FIG. 16, illustrated with HDPE pipe attenuators.

Referring to FIG. 5, lifting anchors 76 are locatable on terminal top 212 of terminal block 210. Lifting anchors 76 provide a means of safely and accurately positioning terminal block 210 in the desired roadside position. Lifting anchors 76 further provide a threaded coupling for cover fasteners 74 as seen in FIG. 2 and FIG. 17. Lifting anchors are located on opposite sides of access chamber 228 and compression chamber 240 to allow a cover plate 70 to cover access chamber 228, portal 226 and compression chamber 240. These locations also permit balanced and safe lifting and positioning of terminal block 210.

As seen in FIG. 5 and in FIG. 6, terminal block 210 has a radius 224 at the intersection of its access end 216 and its traffic side 220. In the embodiment illustrated, radius 224 has a radial length of between approximately 150 and 300 mm, or approximately 6 to 12 inches. Radius 224 acts to encourage deflection of an impacting vehicle back into the roadway. Importantly, radius 224 prevents a spearing impact of a sharp edge into an engaging vehicle. In the embodiment illustrated, there is a radius 224 at the intersection of field side 222 and access end 216 of terminal block 210. In this configuration, terminal block 210 is reversible with regards to radius 224 and in relationship to the roadway.

Figure 7:
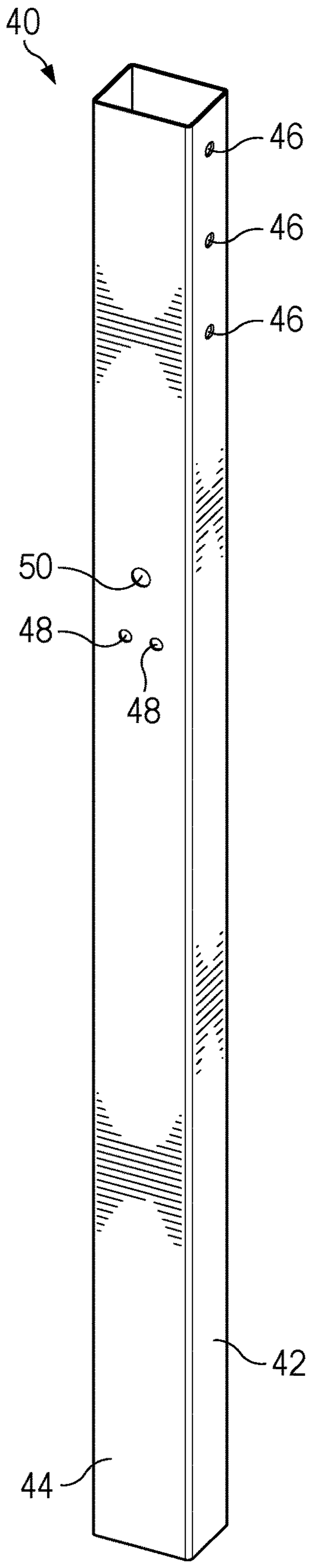
FIG. 7 is a perspective view of a foundation post component of the pedestrian access terminal illustrated in FIG. 1.

FIG. 7 is a perspective view of an embodiment of foundation post 40. In this embodiment, foundation post 40 is a hollow rectangular tubular. Foundation post 40 has a first pair of opposing sides 42, one of which being a traffic side, in that it faces the roadway when installed into the soil. Foundation post 40 has a second pair of opposing sides 44, one of which being an access side, in that it faces the opening 3 between terminal blocks 210 through which pedestrians may pass. The opposite side is a non-access side.

Block fastener ports 46 extend through the first pair of opposing sides 42 of foundation post 40. As best seen in FIG. 2, portal fasteners 236 pass through lateral portal slots 232 and into portal 226 to interconnect transition 100, terminal block 210, and foundation post 40.

A tensioning portal 50 extends through the second pair of opposing sides 44 of each foundation post 40. As may best be seen in FIGS. 2 and 17, tensioning portal 50 receives tensioning member 80 through tensioning portal 50 of each foundation post 40. Tensioning member 80 may be a threaded rod 94 (FIG. 10) or a wire rope configuration 84 (FIG. 10A) or other linear tensioning mechanism.

Referring back to FIG. 7, plate fastener ports 48 extend through the second pair of opposing sides 44 of foundation post 40, beneath, and proximate to tensioning portal 50. As can be seen in FIG. 2, soil plates 60 are attached to foundation post 40 by plate fasteners 68 passing through plate fastener ports 48. In one embodiment, foundation posts 40 may be about 10 feet (3 m) long. Foundation posts 40 embedded at least 7 feet (2.1 m) below surface 2 will achieve the performance characteristics detailed herein.

Figure 8:
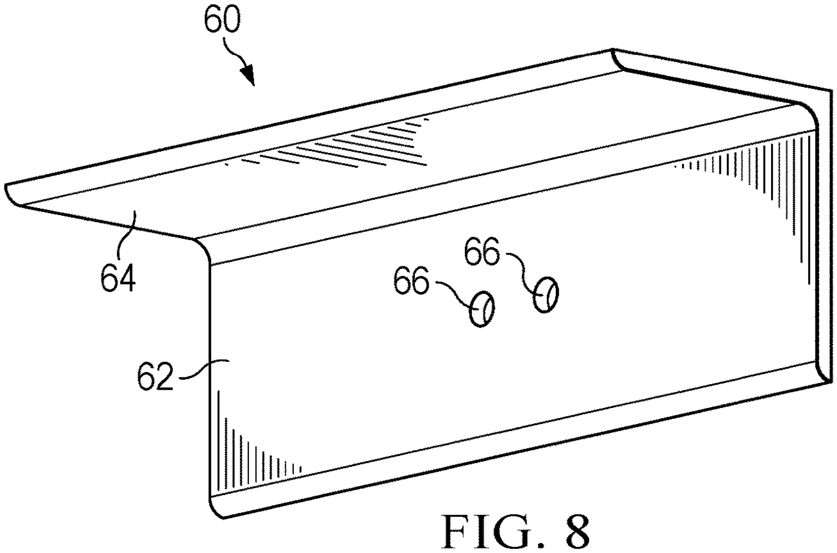
FIG. 8 is a perspective view of an embodiment of the soil plate component.

FIG. 8 is a perspective view of an embodiment of soil plate 60. In this embodiment, soil plate 60 has a post side 62 and an optional block side 64. Without block side 64, soil plate 60 has a singular flat post side 62. This embodiment of soil plate 60 is illustrated in FIG. 2. Fastener ports 66 are located on post side 62. Post side 62 of soil plate 60 is positioned against foundation post 40 such that fastener ports 66 align with plate fastener ports 48 of foundation post 40. In this position of the embodiment illustrated, block fastener ports 46 will simultaneously align with portal slots 232 of terminal block 210, and tensioning portal 50 will be positioned in relief 230 at terminal bottom 214. The simultaneous alignment provides the connectivity illustrated in FIG. 2.

Plate fasteners 68 are positioned through plate fastener ports 48 and fastener ports 66 to secure soil plate 60 to foundation post 40. If used, block side 64 of soil plate 60 facilitates the advantageous three-way alignment of this embodiment by abutment with terminal bottom 214 of terminal block 210. In this manner, assembly of pedestrian access terminal 200 is expedited.

Figure 9:
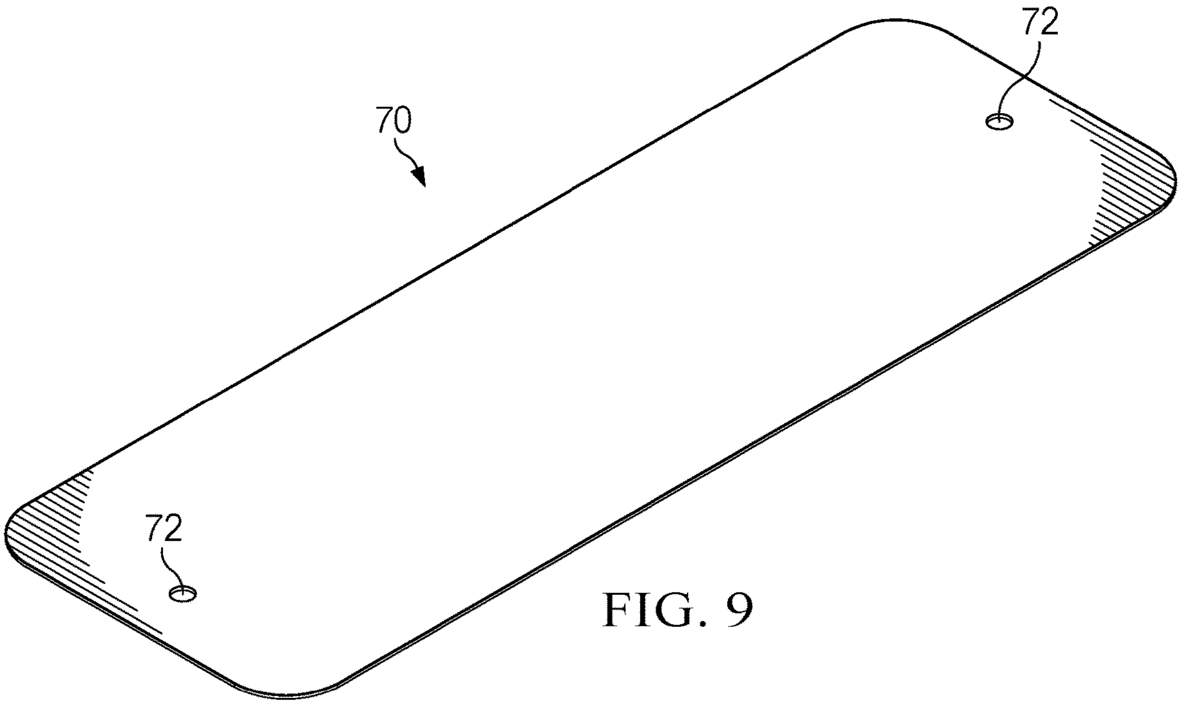
FIG. 9 is a perspective view of a cover plate component of the pedestrian access terminal illustrated in FIG. 2.

FIG. 9 is a perspective view of cover plate 70. Cover plate 70 has a pair of cover ports 72. Cover plate 70 is sufficiently large to cover access chamber 228, portal 226, and compression chamber 240 as they intersect terminal top 212 as seen in FIG. 2. Cover fasteners 74 are connectable to lifting anchors 76 to secure cover plate 70 to terminal block 210. Cover plate 70 provides an aesthetic improvement to pedestrian access terminal 200 and prevents pedestrians from dropping trash, phones, babies, or other objects into access chamber 228, portal 226, and compression chamber 240. Cover plate 70 may be embossed with a city logo or other imagery to further advantage the aesthetic value of pedestrian access terminal 200.

Figure 10:
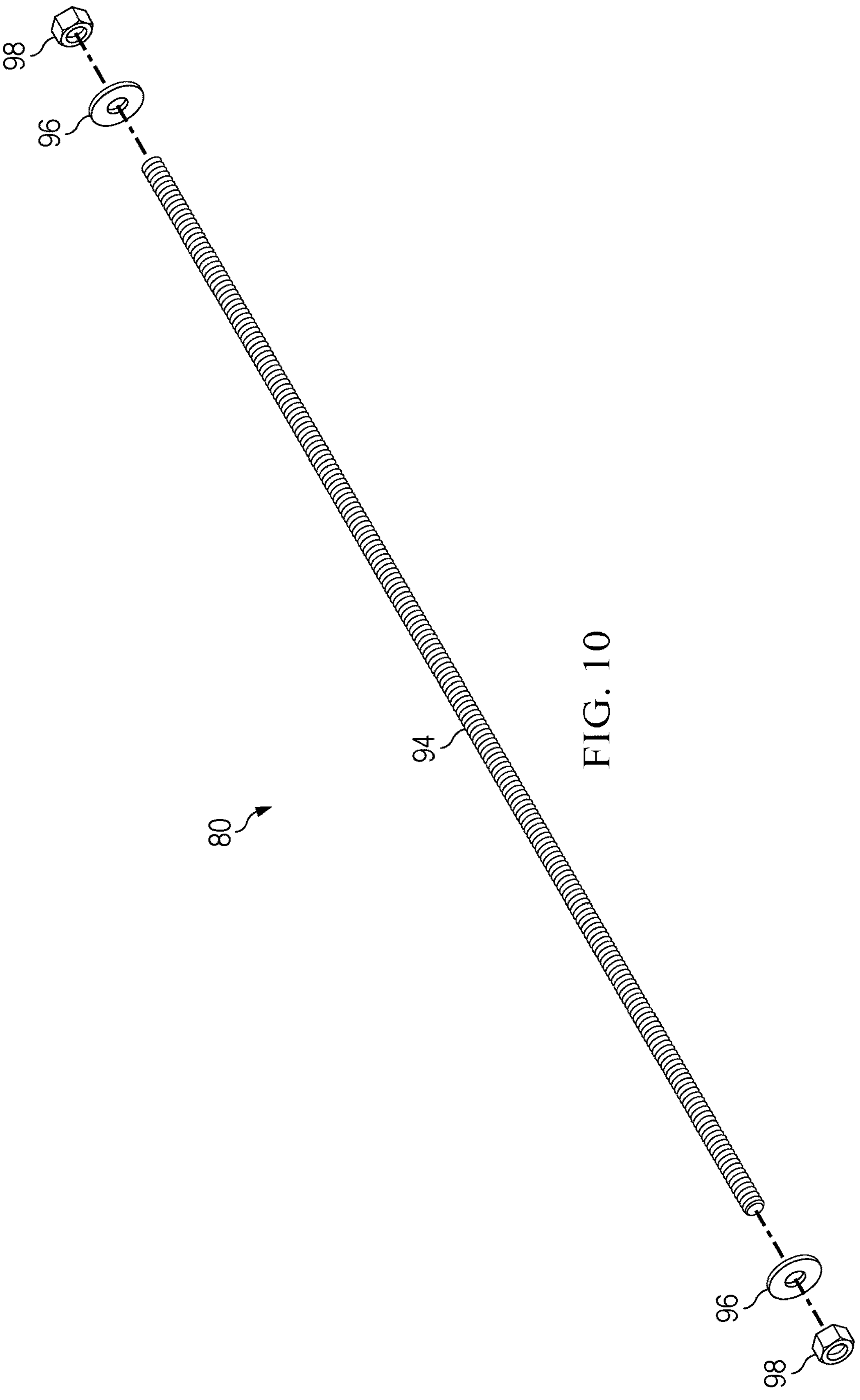
FIG. 10 is a perspective view of the subsurface tensioning member of the pedestrian access terminal illustrated in FIG. 2.

FIG. 10 is a perspective view of a first embodiment of a tensioning member 80. This embodiment is further illustrated in FIG. 2 and FIGS. 13-18. In this embodiment, tensioning member 80 is comprised of threaded rod 94 having an optional washer 96 and an internally threaded fastener 98 attached on each end of threaded rod 94, for securing against the no-access side of second pair of opposing sides 44 of foundation post 40. Tightening one or both of threaded fasteners 98 increases the tension on tensioning member 80, and thus the force resisting separation of foundation posts 40.

Figures 10A, 11, 12:
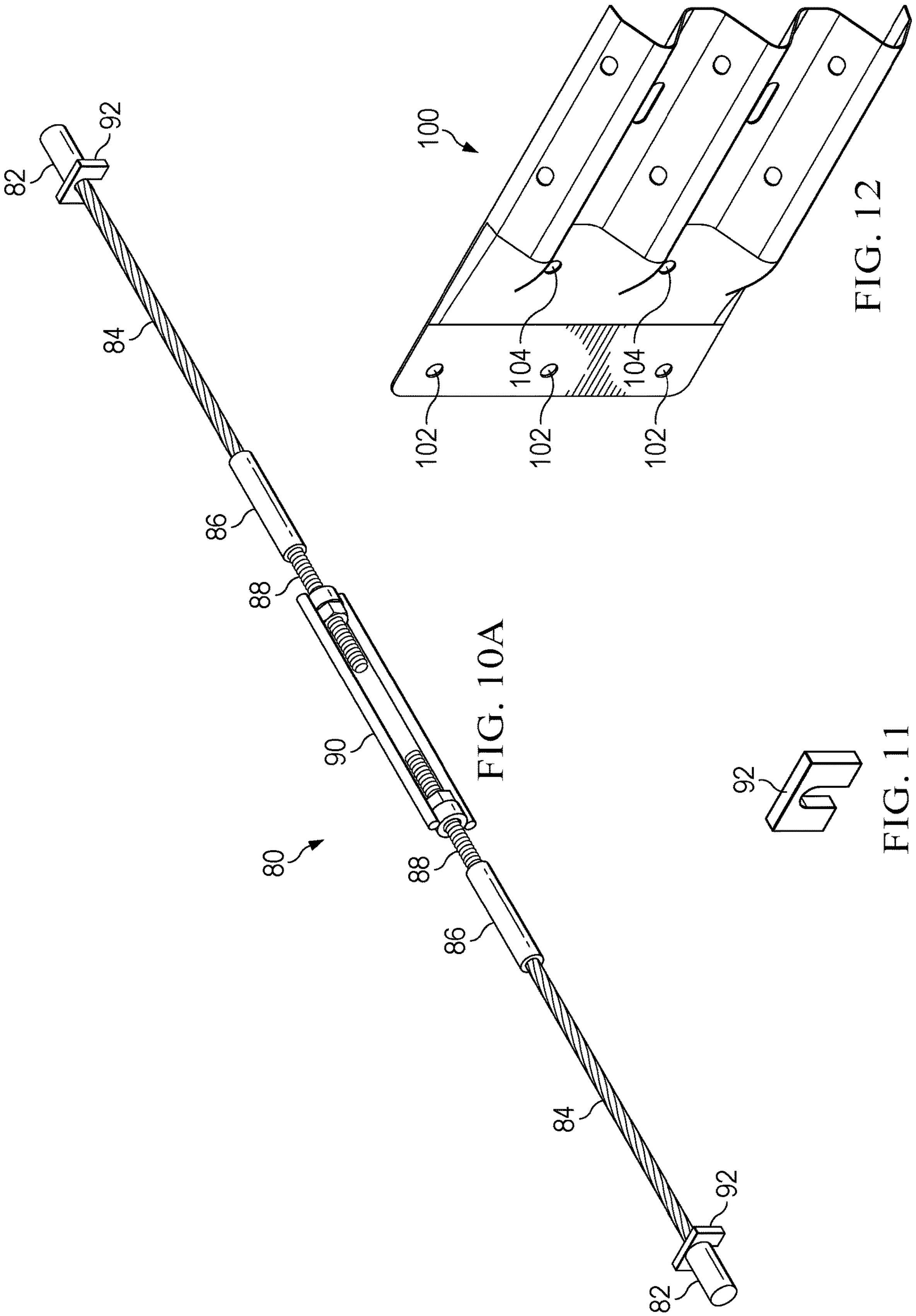
FIG. 10A is a perspective view of an alternative embodiment of the tensioning member of FIG. 10.
FIG. 11 is a perspective view of a plate washer component of the embodiment of the tensioning member of FIG. 10A.
FIG. 12 is a perspective view of a traffic barrier end connector that is connectable to the pedestrian access terminal illustrated in FIG. 1.

FIG. 10A is a perspective view of an alternative embodiment of tensioning member 80. In this embodiment, tensioning member 80 is comprised of a swage button 82 that is swaged onto a length of wire rope 84 at each end of tensioning member 80. Each section of wire rope 84 is connected to a threaded bar 88 by a connector 86. Threaded bars 88 are thread connected to a turnbuckle 90. Rotating turnbuckle 90 shortens or lengthens tensioning member 80 increasing the tension on tensioning member 80, and thus the force resisting separation of foundation posts 40.

FIG. 11 is a perspective view of plate washer 92 of the embodiment of tensioning member 80 illustrated in FIG. 10A. Plate washer 92 anchors swage button 82 at each end of tensioning member 80 against foundation post 40 to allow tensioning member 80 to be tensioned as between foundation posts 40.

Pre-tensioning of opposing terminal blocks 210 to each other provides a greatly enhanced resistance to displacement of either terminal block 210 by a vehicle leaving the roadway. The minimal size of tensioning member 80 provides for rapid and cost-effective subterranean location of tensioning member 80. Tensioning member 80 anchors the impacted terminal block 210 to the non-impacted terminal block 210, resisting bending of foundation post 40 and preventing movement of pedestrian access terminal 200 on impact.

FIG. 12 is a perspective view of transition 100 for connection of pedestrian access terminal 200 to guardrail 106 as seen in FIG. 1. In the embodiment illustrated, transition 100 has a plurality of primary portals 102. Transition 100 may have a plurality of secondary portals 104. The transition 100 illustrated is commonly known in the road safety industry as a thrie-beam terminal connector. As illustrated in FIG. 2, portal fasteners 236 secure transition 100 to terminal block 210 through primary portals 102. Chamber fasteners 238 further secure transition 100 to terminal block 210 through secondary portals 104.

Figure 13:
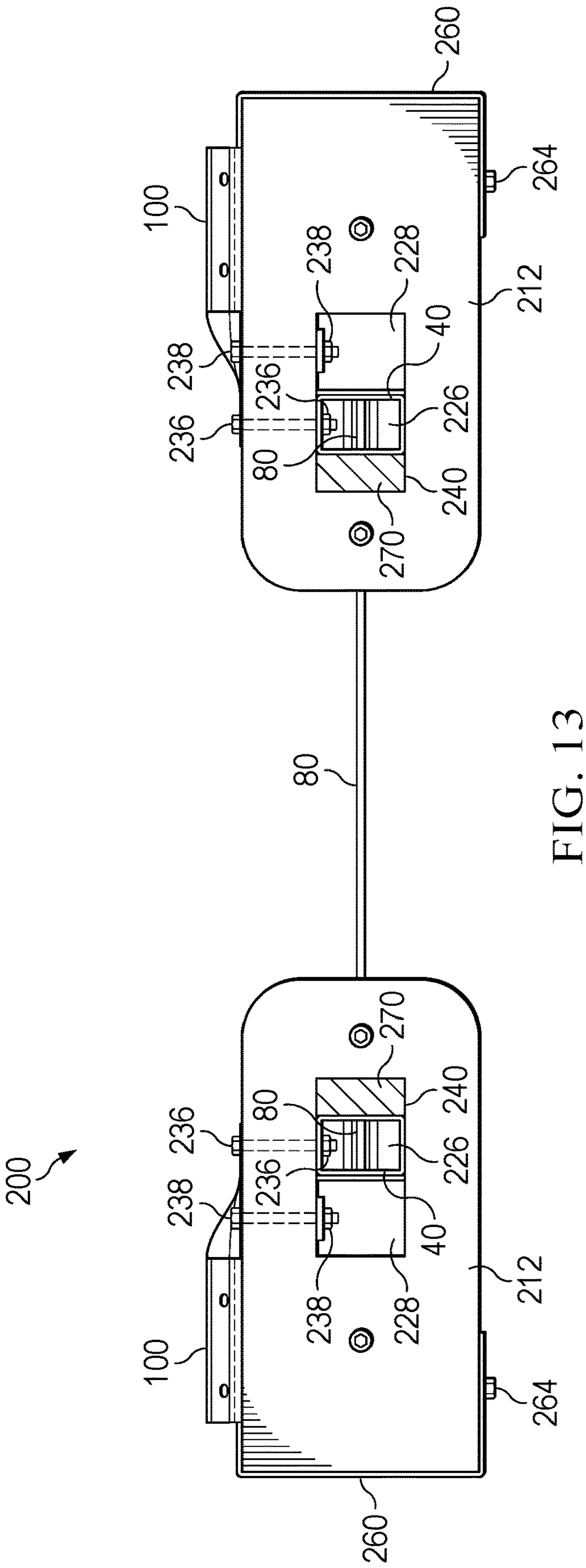
FIG. 13 is a top view of the embodiment of the dynamic pedestrian access terminal illustrated in FIG. 2, with the cover plate removed, and illustrated with polyurethane attenuators.

FIG. 13 is a top view of the embodiment of the dynamic pedestrian access terminal 200 illustrated in FIG. 2, with cover plate 70 removed, and illustrated with internal attenuators 270 installed in compression chamber 240. In the embodiment illustrated, internal attenuators 270 are polyurethane attenuators. As seen in FIG. 13, internal attenuators 270 fill compression chamber 240, and reside proximate foundation post 40, which resides in portal 226.

FIG. 14 is a bottom view of the embodiment of the dynamic pedestrian access terminal 200 illustrated in FIG. 13, further illustrating various passages internal to the embodiment of terminal block 210 of FIG. 13 by hidden lines. As was seen also in FIG. 2 and FIG. 13, internal attenuators 270 are located in compression chamber 240, and external attenuators 280 are located in recess 250.

FIG. 15 is a side view of the first terminal block 210 and a side sectional view of second terminal block 210 of dynamic pedestrian access terminal 200 illustrated in FIGS. 2, 13, and 14. In the embodiment illustrated in this view, terminal blocks 210 are located below surface 2. As best seen in this view, internal attenuator 270 and external attenuator 280 are positioned to compress upon translation of terminal blocks 210 upon a vehicle impact proximate the passage between terminal blocks 210.

Internal attenuator 270 compresses against foundation post 40. Movement of foundation post 40 is limited by its embedment in the ground below surface 2, and further tension applied to tensioning member 80 which is anchored to the non-impacted terminal block 210. External attenuator 280 compresses against tray 260. Movement of tray 260 is limited by its engagement with the ground as it is located beneath surface 2.

This novel configuration allows limited, dynamic translation of terminal block 210 in response to a vehicle impact without collapse of the pedestrian passage 3 between terminal blocks 210. The significant total energy required to move the substantial weight of a terminal block 210 and compressing internal attenuators 270 and external attenuators 280 represents a very substantial absorption of energy that would otherwise be absorbed by contraction of the impacting vehicle and impact forces on its occupants. The present disclosure provides an embodiment with parallel attenuators, including internal attenuator 270 and external attenuator 280. Compression of attenuators 270 and 280 is limited to the volumes of compression chamber 240 and recess 250, and their respective lengths $L_C$ and $L_R$.

In an embodiment with terminal block 210 located partially subsurface, as in FIG. 15, the system provides the shear strength of foundation post 40 and the compression strength of the soil 2 behind recess 250 to cooperatively limit the maximum translation of the impacted terminal block 210. In another embodiment, the tensile strength of the tensioning member 80 further limits maximum translation of terminal block 210 by anchoring foundation post 40 of impacted terminal block 210 to foundation post 40 of the non-impacted terminal block 210 and its entire, non-translating weight and resistance in the surrounding soil. In another embodiment, soil plates 60 add still additional resistance to translation of foundation posts 40.

FIG. 16 is a side view of the first terminal block 210 and a side sectional view of the second terminal block 210 of the dynamic pedestrian access terminal illustrated in FIG. 2. In this embodiment, terminal blocks 210 have internal attenuators 272, and external attenuators 282 comprised of a honeycomb material construction.

FIG. 17 is an exploded perspective view of the first terminal block 210 and a side sectional view of the second terminal block 210 of the dynamic pedestrian access terminal 200 illustrated in FIG. 2. In this embodiment, terminal blocks 210 have internal attenuators 274 and external attenuators 284 comprised of HDPE pipe.

Figure 18:
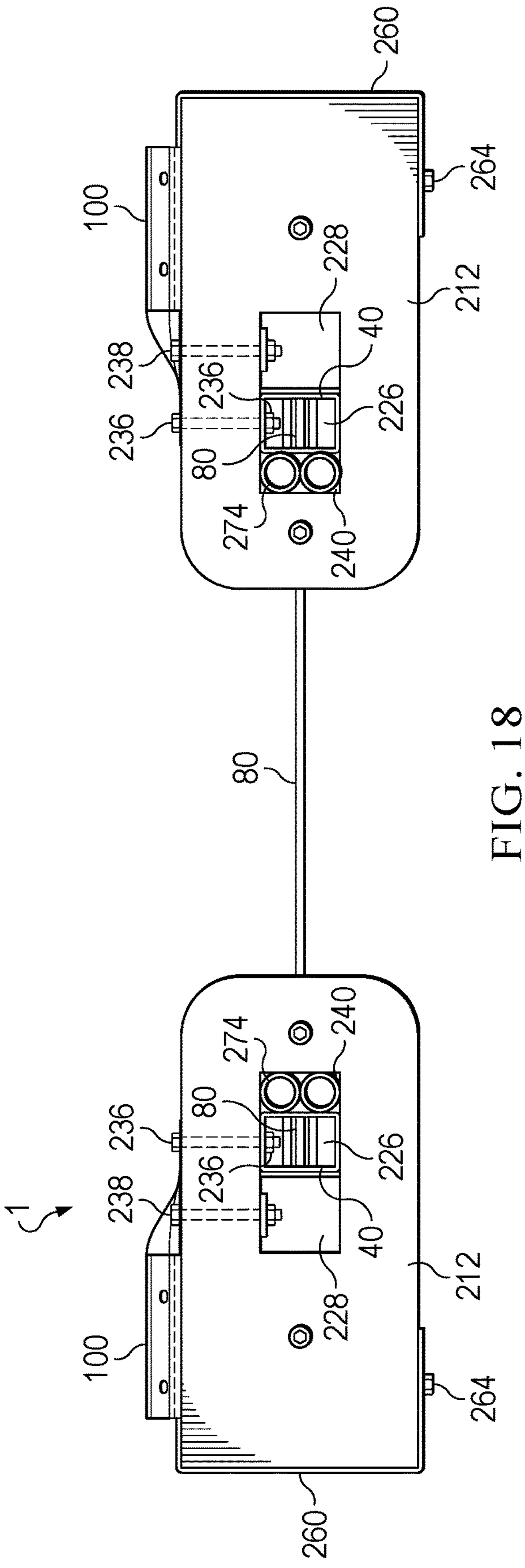
FIG. 18 is a top view of the embodiment of the dynamic pedestrian access terminal illustrated in FIG. 17, with the cover plate removed, and illustrated with HDPE pipe attenuators.

FIG. 18 is a top view of the embodiment of the dynamic pedestrian access terminal 200 illustrated in FIG. 17, with cover plate 70 removed, and illustrated with internal attenuators 274 and external attenuators 284 comprised of HDPE pipe.

Internal attenuator 270 may be of a like or dissimilar material and structure to that of external attenuator 280 to achieve different acceleration responses to impacts, or to balance responses realized by the differences in the volumes of internal attenuator 270 and external attenuator 280.

As used herein, the term "substantially" is intended for construction as meaning "more so than not".

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure, and in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A dynamic pedestrian access terminal, comprising:
- a right side and a left side terminal block, each terminal block comprising:
  - a top and an opposite bottom, the bottom positioned beneath a surface of a road;
  - an access end, and an opposite non-access end;
  - a traffic side and an opposite field side;
  - a portal extending from the top to the bottom; and,
  - a compression chamber extending from the top to the bottom, and adjacent the portal;
- a pair of foundation posts, each post extending from below a ground surface to inside the portal of one of the terminal blocks; and,
- an internal attenuator inside the compression chamber;
- wherein the internal attenuator absorbs energy when compressed between the foundation post and the terminal block by translation of the terminal block upon impact by a vehicle.

2. The dynamic pedestrian access terminal of claim 1, further comprising:
- a plurality of portal slots extending through the traffic side of each terminal block to intersect the portal;
- portal fasteners located in the portal slots and connecting each foundation post to its respective terminal block; and,
- the terminal blocks translatable in relation to the foundation post that extends within the portal of the terminal blocks.

3. The dynamic pedestrian access terminal of claim 1, further comprising:
- the internal attenuator comprising a polyurethane material.

4. The dynamic pedestrian access terminal of claim 1, further comprising:
the internal attenuator comprising a honeycomb structured material.

5. The dynamic pedestrian access terminal of claim 1, further comprising:
the internal attenuator comprising a HDPE material.

6. The dynamic pedestrian access terminal of claim 1, further comprising:
the terminal blocks having a weight of between 3,000 and 3,600 lbs. (1,361 kg and 1,633 kg).

7. The dynamic pedestrian access terminal of claim 1, further comprising:
the terminal blocks being spaced a distance of 3.3 feet (1 m) apart.

8. The dynamic pedestrian access terminal of claim 1, further comprising:
the terminal blocks having a rounded corner with a radius of at least 0.5 feet (150 mm) at the intersection of the traffic side and the access end.

9. The dynamic pedestrian access terminal of claim 1, further comprising:
the foundation posts being embedded at least 7 feet below the surface.

10. The dynamic pedestrian access terminal of claim 2, the each of the foundation posts further comprising:
a hollow rectangular tubular;
a first pair of opposing sides, one of which being a traffic side;
a second pair of opposing sides, one of which being a field side;
block fastener ports extending through the first pair of opposing sides; and,
the portal fasteners passing through the portal slots and into the portal to connect a traffic barrier and the foundation post to the terminal block.

11. The dynamic pedestrian access terminal of claim 10, further comprising:
plate fastener ports extending through the second pair of opposing sides of the foundation post, beneath a tensioning portal;
a soil plate having fastener ports in alignment with the plate fastener ports; and,
soil plate fasteners located through the fastener ports of the soil plate and the plate fastener ports of the foundation post to secure the soil plate to the foundation post.

12. The dynamic pedestrian access terminal of claim 1, further comprising:
a pair of lifting anchors located at the top of each terminal block;
a cover plate sufficiently large to cover the portal and an access chamber on the top of the terminal block;
a pair of cover ports on the cover plate; and,
cover fasteners located in the cover plate and connected to the lifting anchors to secure the cover plate to the top of the terminal block.

13. The dynamic pedestrian access terminal of claim 10, further comprising:
the bottom of each of the terminal blocks being set in a soil between 8 and 14 inches below a soil surface.

14. The dynamic pedestrian access terminal of claim 1, further comprising:
a tensioning member extending between each of the foundation posts.

15. The dynamic pedestrian access terminal of claim 14, further comprising:
a relief on the bottom of the terminal block;
the relief intersecting the portal opening at the bottom of the terminal block; and,
the tensioning member located in the relief of the terminal block and being anchored against the foundation post.

16. The dynamic pedestrian access terminal of claim 14, further comprising:
the tensioning member further comprising:
a threaded bar; and,
a threaded fastener connected at each end of the threaded bar.

17. The dynamic pedestrian access terminal of claim 10, further comprising:
a tensioning portal extending through the second pair of opposing sides of each foundation post;
a tensioning member extending through the tensioning portal of each foundation post;
the tensioning member being a threaded bar;
an internally threaded fastener located on each end of the tensioning member and secured on each end, against the foundation post; and,
wherein the tensioning member is tensioned between the foundation posts by engaging rotation of the threaded fastener.

18. The dynamic pedestrian access terminal of claim 1, further comprising:
an access chamber extending through the top of the terminal block adjacent to the portal;
the access chamber terminating internal to the terminal block;
chamber slots extending from the traffic side and the field side to the access chamber; and,
chamber fasteners located in the chamber slots connecting the traffic barrier to the terminal block.

19. The dynamic pedestrian access terminal of claim 2, further comprising:
a recess located at an intersection of the bottom and the non-access end of the terminal block;
an external attenuator located in the recess; and,
a tray enclosing the external attenuator between the recess and the tray;
wherein the external attenuator absorbs energy when compressed between the tray and the terminal block by translation of the terminal block upon impact by a vehicle.

20. The dynamic pedestrian access terminal of claim 19, further comprising:
a plurality of tray slots; and,
tray fasteners located in the tray slots connecting each tray in translatable relation to one of the terminal blocks.

21. The dynamic pedestrian access terminal of claim 19, further comprising:
the recess having a width equal to a width of the compression chamber.

22. The dynamic pedestrian access terminal of claim 19, further comprising:
the internal attenuator having a width equal to a width of the external attenuator.

23. The dynamic pedestrian access terminal of claim 19, further comprising:
the external attenuator comprising a polyurethane material.

24. The dynamic pedestrian access terminal of claim 19, further comprising:
the external attenuator comprising a honeycomb structured material.

25. The dynamic pedestrian access terminal of claim 19, further comprising:

the external attenuator comprising a HDPE material.

* * * * *